(12) United States Patent
Cook

(10) Patent No.: US 7,099,307 B2
(45) Date of Patent: *Aug. 29, 2006

(54) AUTOMATED CROSS-BOX AND METHODS FOR USING AN AUTOMATED CROSS-BOX

(75) Inventor: Charles I. Cook, Louisville, CO (US)

(73) Assignee: Qwest Communications International Inc., Denver, CO (US)

( * ) Notice: Subject to any disclaimer, the term of this patent is extended or adjusted under 35 U.S.C. 154(b) by 114 days.

This patent is subject to a terminal disclaimer.

(21) Appl. No.: 10/434,429

(22) Filed: May 7, 2003

(65) Prior Publication Data

US 2004/0228468 A1 Nov. 18, 2004

(51) Int. Cl.
*H04L 12/66* (2006.01)

(52) U.S. Cl. ............... 370/352; 379/15.01; 379/15.02

(58) Field of Classification Search ............ 379/15.03, 379/32.03, 15.01, 15.02; 385/18; 370/465, 370/468, 352, 380
See application file for complete search history.

(56) References Cited

U.S. PATENT DOCUMENTS

| | | | |
|---|---|---|---|
| 5,282,241 A | 1/1994 | Aoki et al. | |
| 5,299,044 A * | 3/1994 | Mosch et al. | ............... 398/35 |
| 5,319,700 A | 6/1994 | Mano et al. | |
| 5,337,348 A | 8/1994 | Yamazaki et al. | |
| 5,339,355 A | 8/1994 | Mori et al. | |
| 5,408,522 A | 4/1995 | Ikehata et al. | |
| 5,442,702 A * | 8/1995 | van Ooijen et al. | ........ 713/162 |
| 5,477,531 A | 12/1995 | McKee et al. | |
| 5,722,048 A | 2/1998 | Javitt | |
| 5,963,540 A | 10/1999 | Bhaskaran | |
| 5,974,331 A | 10/1999 | Cook et al. | |
| 6,049,699 A | 4/2000 | Javitt | |
| 6,055,414 A | 4/2000 | Javitt | |
| 6,070,057 A | 5/2000 | Javitt | |
| 6,072,793 A * | 6/2000 | Dunn et al. | ............... 370/352 |
| 6,137,990 A | 10/2000 | Javitt | |
| 6,240,295 B1 | 5/2001 | Kennedy, III | |
| 6,266,523 B1 | 7/2001 | Cook et al. | |
| 6,275,709 B1 | 8/2001 | Do | |
| 6,353,746 B1 | 3/2002 | Javitt | |
| 6,396,975 B1 * | 5/2002 | Wood et al. | ............... 385/18 |
| 6,445,842 B1 | 9/2002 | Dhuler et al. | |
| 6,470,074 B1 * | 10/2002 | Teixeria | ............... 379/32.04 |
| 6,490,382 B1 | 12/2002 | Hill | |
| 6,507,565 B1 | 1/2003 | Taylor | |
| 6,512,755 B1 | 1/2003 | Deschaine et al. | |
| 6,529,909 B1 | 3/2003 | Bowman-Amuah | |
| 6,535,311 B1 | 3/2003 | Lindquist | |
| 6,546,004 B1 | 4/2003 | Gullicksen | |
| 6,546,163 B1 | 4/2003 | Thackara | |
| 6,549,587 B1 | 4/2003 | Li | |
| 6,549,949 B1 | 4/2003 | Bowman-Amuah | |
| 6,550,057 B1 | 4/2003 | Bowman-Amuah | |
| 6,618,518 B1 * | 9/2003 | Mahadevan et al. | ......... 385/18 |

* cited by examiner

*Primary Examiner*—Doris H. To
*Assistant Examiner*—Robert W. Wilson
(74) *Attorney, Agent, or Firm*—Townsend and Townsend and Crew LLP

(57) ABSTRACT

Systems and methods for remotely switching telecommunication access sources. Exemplary systems include a communication device that is operable to receive a selection, and a micro electro-mechanical cross-connect that is, based on the selection, operable to route a source to an output, such as a subscriber line. The exemplary systems further include a control device that is operable to receive the selection from the communication device, and to provide a selector derived from the selection to the micro electro-mechanical cross-connect. Various methods are also included for operating a telecommunications network that includes such systems.

21 Claims, 10 Drawing Sheets

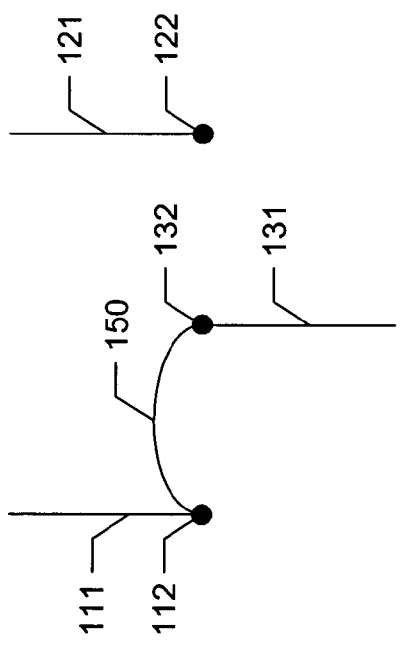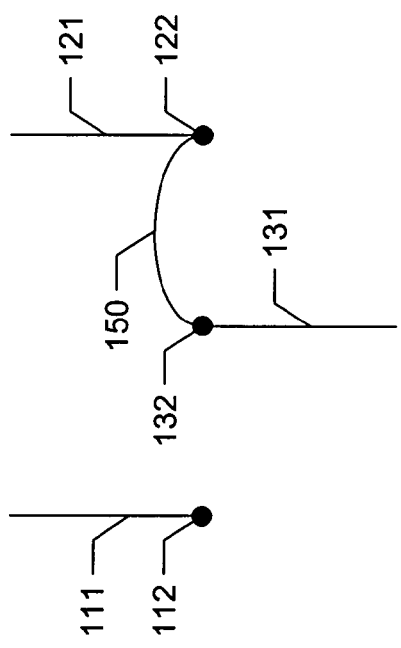

AUTOMATED CROSS-BOX AND METHODS FOR USING AN AUTOMATED CROSS-BOX

CROSS-REFERENCES TO RELATED APPLICATIONS

The present application is related to U.S. patent application Ser. No. 10/434,428, entitled "SYSTEMS AND METHODS FOR PROVIDING POOLED ACCESS IN A TELECOMMUNICATIONS NETWORK", and assigned to an entity common herewith. The aforementioned Patent Application is incorporated herein by reference for all purposes, and is filed on a date even herewith.

BACKGROUND OF THE INVENTION

The present invention is related to telecommunications networks, and in particular to cross-boxes implemented in relation to telecommunications networks.

As illustrated in FIG. 1a, a telecommunications network 100 can include a two service providers 110, 120 with access to a consumer premises 140 via a cross-box 130. The service providers can include supporting service provider 110 that maintains cross-box 130 and provides services via connection 111, and accessing service provider 120 that merely provides services via connection 121 connected to cross-box 130. Cross-box 130 is connected to consumer premises 140 via connection 131.

As an example, service provider 110 can be an ILEC (Incumbent Local Exchange Carrier), while service provider 120 is a CLEC (Competitive Local Exchange Carrier). When the ILEC servicing consumer premises 140 is to be changed, a service technician must be dispatched to physically change the service selection at cross-box 130. This can include, as depicted in FIGS. 1b and 1c, changing a jumper 150 to connect points 112 and 132, or points 122 and 132 and thus couple connection 131 to a selected one of connection 111 or connection 121. This process is expensive and time consuming.

Hence, there exists a need in the art for advanced systems and methods for implementing cross-boxes.

BRIEF SUMMARY OF THE INVENTION

Among other things, the present invention provides systems and methods for implementing automated cross-boxes. Such automated cross-boxes can be controlled from a central office, or other location remote from the cross-box, thus reducing the need to dispatch service technicians. Further, in some cases, the function of the automated cross-box can be implemented directly in other telecommunications equipment, thus reducing the need for a separate cross-box enclosure. In one particular case, the cross-box functionality can be implemented in telecommunications equipment located at a consumer premises where multiple access sources are available, or at various points in the network to be able to select one of a multitude of physical connections.

In particular cases, the cross-connect function of the cross-box is implemented electronically in a non-transistor based switching approach. Such a cross-box can be implemented as one or more MEMs (Micro-ElectroMechanical Systems) switches that do not rely on transistors to switch one access source to another. In various cases, these switches can provide increased frequency response sufficient to allow a twisted pair plain old telephone system ("POTS") service to be electronically switched to an xDSL line card. Further, this capability can be implemented in a small, relatively inexpensive package when compared to larger relay switches, and at the same time provide increased reliability and greater system integration.

Some embodiments of the present invention provide automated telecommunications switch systems. The systems include a communication device that is operable to receive a selection, and a micro electro-mechanical cross-connect that is operable to route an access source to an output based at least in part on the selection. In addition, the systems include a control device that is operable to receive the selection from the communication device, and to provide a selector derived from the selection to the micro electro-mechanical cross-connect. Thus, in some cases, the automated telecommunications switch system can be controlled from a home office, or another location remote from the cross-connect.

In some instances, both the communication device and the control device are implemented on a common semiconductor die, and/or within a common semiconductor package. In some cases, the semiconductor wafer is processed into a CMOS device. In some cases, the selector is provided at CMOS signal levels.

Various cases further include a microprocessor, which can be integrated with the communication device. In some cases, the control device is integrated in a common package with the micro electro-mechanical cross-connect that can be, for example, a silicon based MEMs device. Such a MEMs device can be manufactured to have redundancy that increases the reliability of the micro electro-mechanical cross-connect. This redundancy can include multiple parallel paths switched via multiple switches, or contacts, under common controls, or by multiple switches under distinct controls.

Other embodiments of the present invention provide telecommunications systems that include two or more source accesses and a control input. In some cases, the control input is provided from a central office, or other location remote from the signal switching functionality. This same central office may provide one or more of the source accesses. In addition, the systems further include a communication device that receives the control input signal and transfers it, or a derivative thereof, to a control device. The control device provides a selector derived from the control input to a micro electro-mechanical cross-connect. Based on the selector, the micro electro-mechanical cross-connect can route a selected one of the two or more source accesses to an output. In some cases, the system also includes a microprocessor integrated with the communication device and the control device in either the same semiconductor package, or on the same semiconductor die.

In some cases, the micro electro-mechanical cross-connect is a silicon based MEMS device. Further, in various cases, at least one of the source accesses is a high frequency source access that can be, for example, an xDSL access. As used herein, a high frequency source can be any source operating at a frequency range greater than that of a POTs service, or an ISDN service. Further, as used herein, an xDSL technologies are any technology within the family of DSL technologies including, but not limited to, ADSL, ADSL2, ADSL2+, HDSL, HDSL2, HDSL4, and SHDSL.

Yet further embodiments of the present invention provide methods for provisioning a telecommunications network. The methods include receiving a configuration request in relation to the telecommunications network and formatting the configuration request as a selector. The selector is communicated to a network device coupled to the telecommunications network. The network device includes a communication element that is operable to receive the selector and an electro-mechanical cross-connect. The micro electro-mechanical cross-connect is operable to route a selected source access to an access point. The network device further includes a control device that is operable to receive the selector from the communication device, and to provide a control signal to the micro electro-mechanical cross-connect.

The summary provides only a general outline of the embodiments according to the present invention. Many other objects, features and advantages of the present invention will become more fully apparent from the following detailed description, the appended claims and the accompanying drawings.

BRIEF DESCRIPTION OF THE DRAWINGS

A further understanding of the nature and advantages of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

Figure 1A:
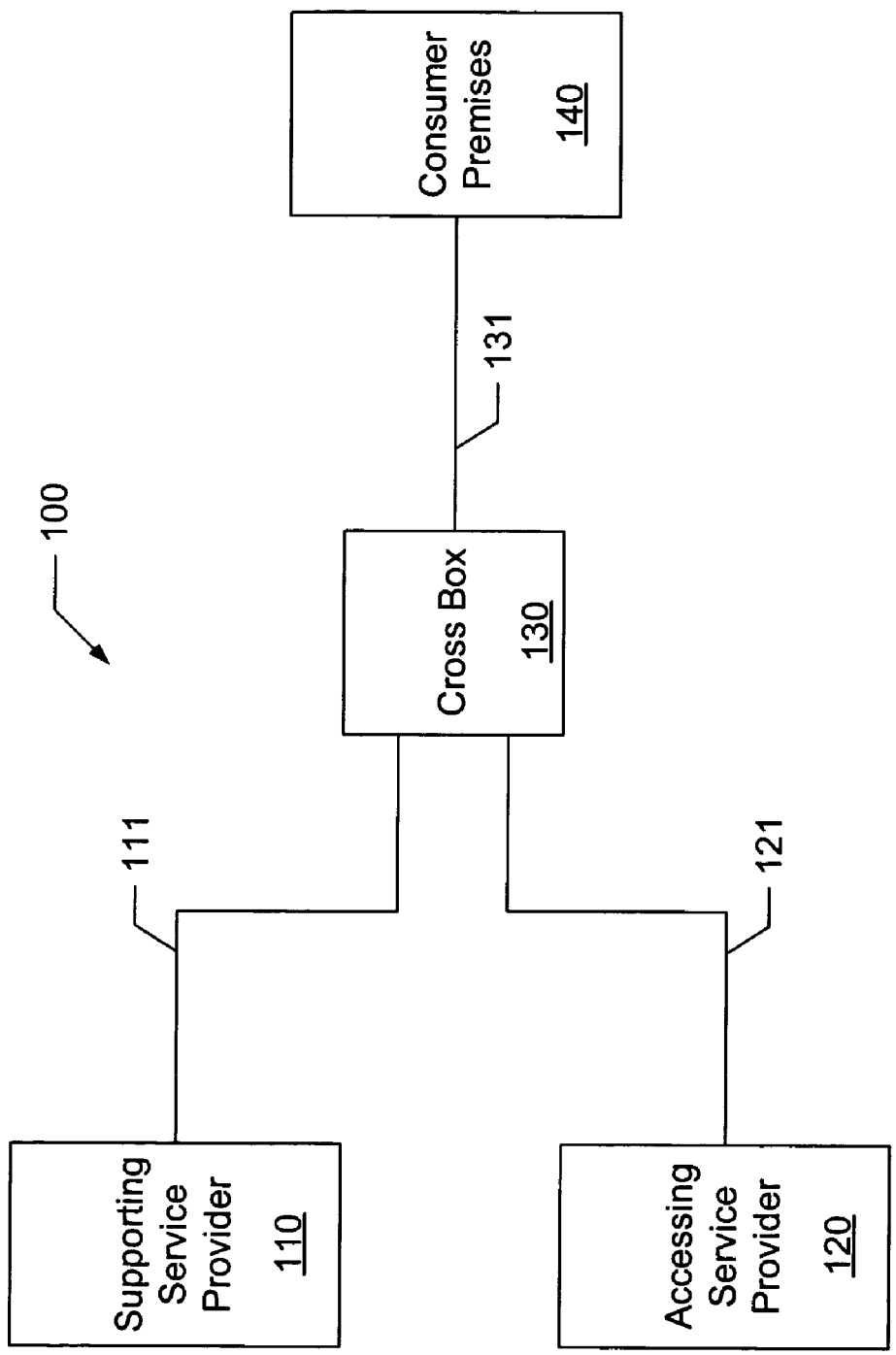
FIG. 1 illustrate representative diagrams of a prior art telecommunications networks including a cross-box enclosure, and locally modified cross-connects.

Among other things, the present invention provides systems and methods for directing network access. In particular cases, the network access is provided via automated cross-boxes. As used herein, an automated cross-box is any system capable of switching a selected access source to an access point. Such automated cross-boxes can be controlled from a central office, or other location remote from the cross-box, thus reducing the need to dispatch service technicians. An access source is any service provider associated with a given network. Thus, for example, an access source can be an xDSL provider, a local voice service provider, a long distance voice service provider, and the like. An access point is any avenue through which services of a network can be accessed. Thus, for example, an access point can be an xDSL connection at a consumer premises.

In some cases, the function of the automated cross-box can be implemented directly in other telecommunications equipment, thus reducing the need for a separate cross-box enclosure. In one particular case, the cross-box functionality can be implemented in telecommunications equipment located at a consumer premises. This can include, for example, providing cross-box functionality on a circuit card, or within a piece of consumer equipment. As just one example, automated cross-box functionality can be implemented in a network interface device as more fully described in U.S. patent application Ser. No. 10/356,364, entitled "PACKET NETWORK INTERFACE DEVICE AND SYSTEMS AND METHODS FOR ITS USE," filed Jan. 31, 2003 by Bruce A. Phillips et al.; U.S. patent application Ser. No. 10/356,688, entitled "SYSTEMS, METHODS AND APPARATUS FOR PROVIDING A PLURALITY OF TELECOMMUNICATION SERVICES," filed Jan. 31, 2003 by Bruce A. Phillips et al.; U.S. patent application Ser. No. 10/356,388, entitled "CONFIGURABLE NETWORK INTERFACE DEVICE AND SYSTEMS AND METHODS FOR ITS USE," filed Jan. 31, 2003 by Bruce A. Phillips et al.; U.S. patent application Ser. No. 10/367,596, entitled "SYSTEMS AND METHODS FOR DELIVERING A DATA STREAM TO A VIDEO APPLIANCE," filed Feb. 14, 2003 by Steven M. Casey et al.; U.S. patent application Ser. No. 10/367,597, entitled "SYSTEMS AND METHODS FOR PROVIDING APPLICATION SERVICES," filed Feb. 14, 2003 by Steven M. Casey et al. Each of the preceding applications is assigned to an entity common herewith, and the entire disclosure of each of the aforementioned applications is herein incorporated by reference for all purposes.

In particular cases, the cross-connect function of the cross-box is implemented electronically in a non-transistor based switching approach. Such a cross-box can be implemented as one or more microelectro-mechanical system (MEMs) electro-mechanical switches that do not rely on transistors or relays to switch one access source to another. In various cases, these switches can provide increased frequency response sufficient to allow a twisted pair plain old telephone system ("POTS") service to be electronically switched to an xDSL line card. Alternatively, a copper twisted pair that terminates at the subscriber premises can be coupled to a line card, which could be a POTS line card, an xDSL line card, and xDSL line card with POTS functionality, and/or an F2 copper pair that terminates at the central office.

Further, this capability can be implemented in a small, relatively inexpensive package when compared to larger electro-mechanical switches, and at the same time provide increased reliability and greater system integration. Thus, for at least this reason, the present invention offers substantial advantages over a switching network implemented in relays that are both expensive and difficult to manufacture. Further, the present invention offers substantial advantages over a switching network implemented using transistor based devices that are unable to pass spectral signals from DC up to tens of MegaHertz and above.

Figure 2:
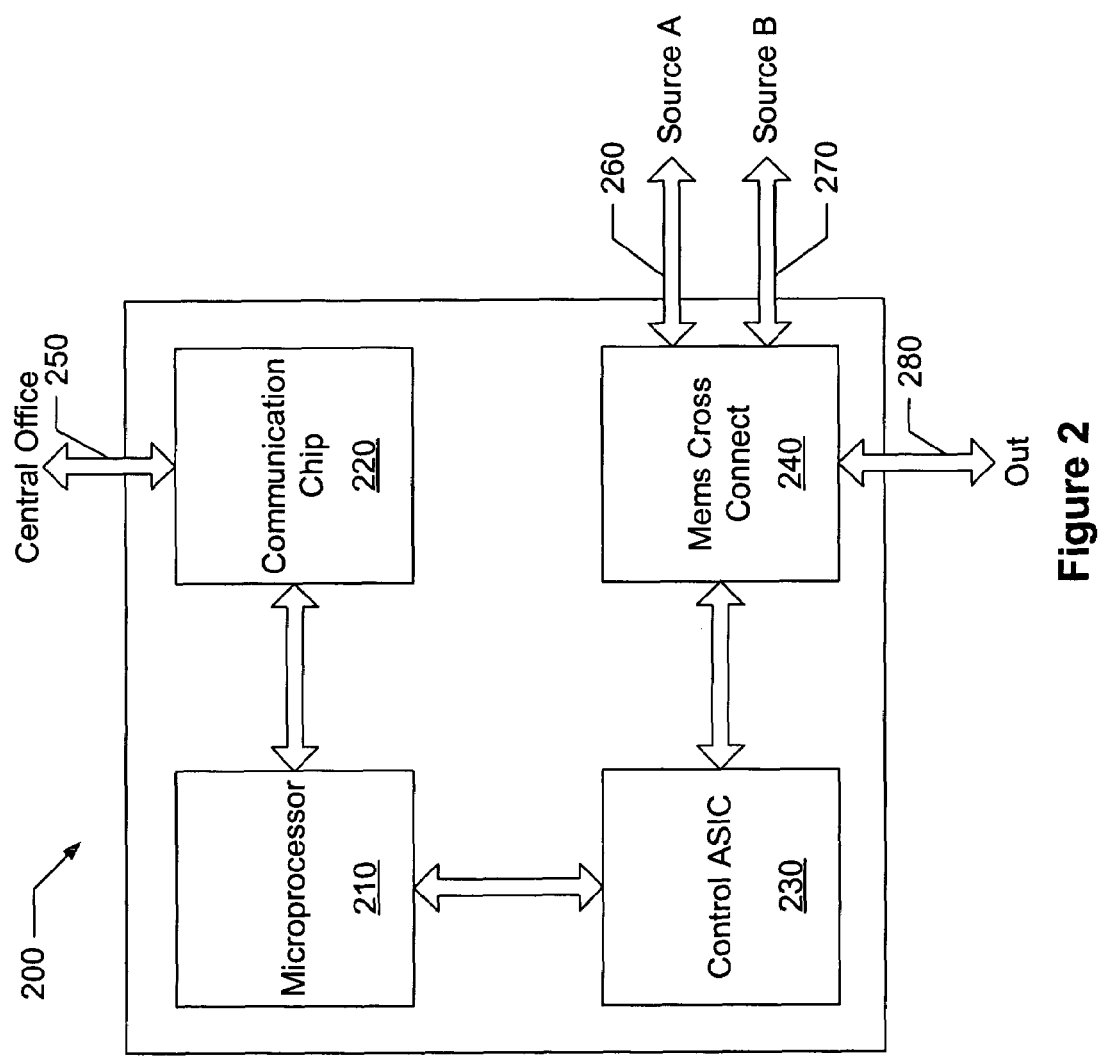
FIG. 2 is a block diagram of a automated cross-connect in accordance with some embodiments of the present invention.

Referring to FIG. 2, an automated cross-connect device 200 is illustrated in accordance with some embodiments of the present invention. Automated cross-connect 200 includes a microprocessor 210, a communication element 220, a control element 230, and a micro electro-mechanical cross-connect 240. Communication element 220 is coupled to a control source, such as a central office by a control medium 250. Electro-mechanical cross-connect 240 is coupled to two or more access sources via access source media 260, 270 and to an access point via an access point medium 280.

Microprocessor 210 can be any device capable of accessing and executing computer executable instructions. In some cases, microprocessor 210 can be implemented on the same die, or within the same semiconductor package as other elements of automated cross-connect device 200. In other cases, microprocessor 210 is a stand alone, imbedded processor as are known in the art. In such cases, microprocessor 210 can be placed on a circuit card with other elements of automated cross-connect device 200. In some cases, an external memory element, such as a read only memory (ROM) is provided with the microprocessor. Based on this disclosure, one of ordinary skill in the art will appreciate that the microprocessor can be coupled to a number of different memory types including, for example, random access memory (RAM) non-volatile ROM, and/or a database comprised of a hard disk drive, a floppy disk drive, a CD ROM, and/or the like.

Communication element 220 can be any device capable of receiving selection information in relation to automated cross-connect device 200. Further, in some cases, communication element 220 can be capable of transmitting information to the control source, or to other elements on the network. Based on this disclosure, one of ordinary skill in the art will appreciate the variety of communication devices that can be used to implement communication element 220.

The control information received by communication element 220 is received via control medium 250, that can be any medium for communicating control information from a control source to communication element 220. Thus, for example, control medium can be a fiber optic connection, a satellite connection, a copper twisted pair connection, a radio frequency (RF) connection, or the like. Further, control medium 250 can be any combination of the aforementioned media.

Control element 230 can be any device capable of communicating selection information to electro-mechanical cross-connect 240. Thus, for example, control element 230 can be an application specific integrated circuit (ASIC) with outputs that are compatible with electro-mechanical cross-connect 240. Alternatively, control element 230 can be implemented in software as part of microprocessor 210, and utilize outputs from microprocessor 210 to communicate with electro-mechanical cross-connect 240. Based on this disclosure, one of ordinary skill in the art will appreciate a number of different ways to implement control element 230.

In one particular embodiment, electro-mechanical cross-connect 240 is a MEMs device with a number of electro-mechanical switches implemented thereon. In some cases, electro-mechanical cross-connect 240 is implemented on a silicon substrate using various other materials to build the various switches and control circuitry thereon. Other types of substrates include, but not limited to, gallium arsenide. Various embodiments of MEMs based electro-mechanical cross-connects are described below in relation to FIGS. 3 and 4.

In one particular embodiment of the present invention, communication element 220, microprocessor 210, and control element 230 are implemented on a single die. Automated cross-connect 200 can include one of these combination elements to control a number of electro-mechanical cross-connects 240 all implemented on another MEMs die. Thus, embodiments of the present invention can include a two chip solution capable of switching tens, or even hundreds of access sources to access points. Based on the disclosure provided herein, one of ordinary skill in the art will appreciate the myriad of combinations of some or all of the elements of automated cross-connect device 200 on semiconductor die, within semiconductor packages, and/or on circuit cards. For example, in yet another embodiment, a microprocessor is not included, and communication element 220, control element 230, and electro-mechanical cross-connect 240 are implemented on a common silicon substrate, and/or within a common semiconductor package.

Figure 3A:
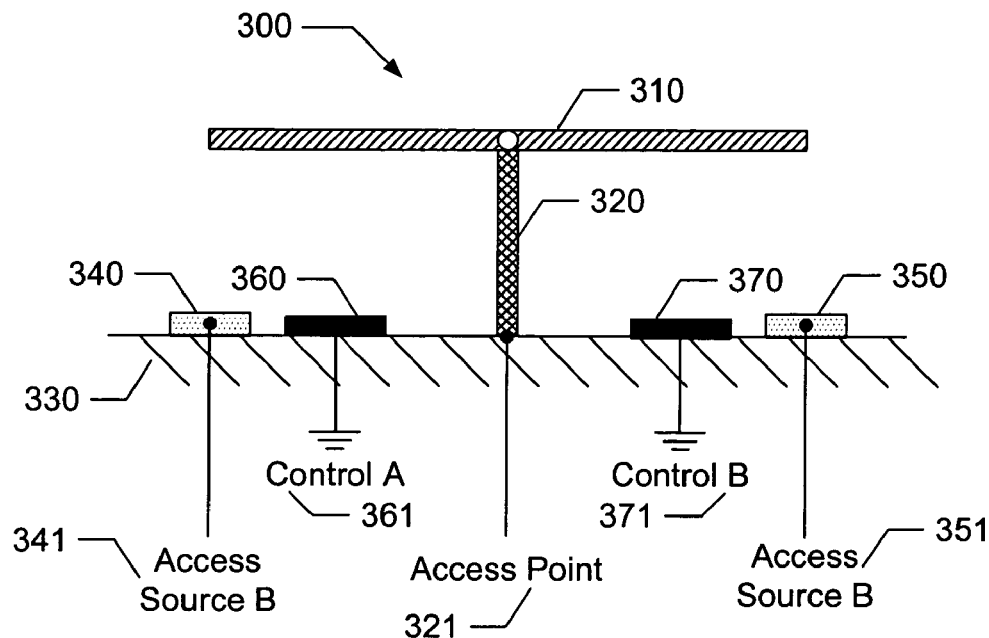
FIG. 3 shows an exemplary embodiment of a MEMs based electro-mechanical switch useful in relation to various embodiments of the present invention.

Turning now to FIG. 3a, a MEMs based electro-mechanical switch 300 useful in relation to the present invention is depicted. Switch 300 includes a conductive cantilever 310 supported by a conductive pivot 320. Conductive pivot 320 is disposed on a semiconductor substrate 330. Contacts 340, 350 and actuators 360, 370 are also disposed on semiconductor substrate 330. Contact 340 is electrically coupled to one access source 341, and contact 350 is electrically coupled to another access source 351. Conductive pivot 320 is electrically coupled to an access point 321.

Figure 3B:
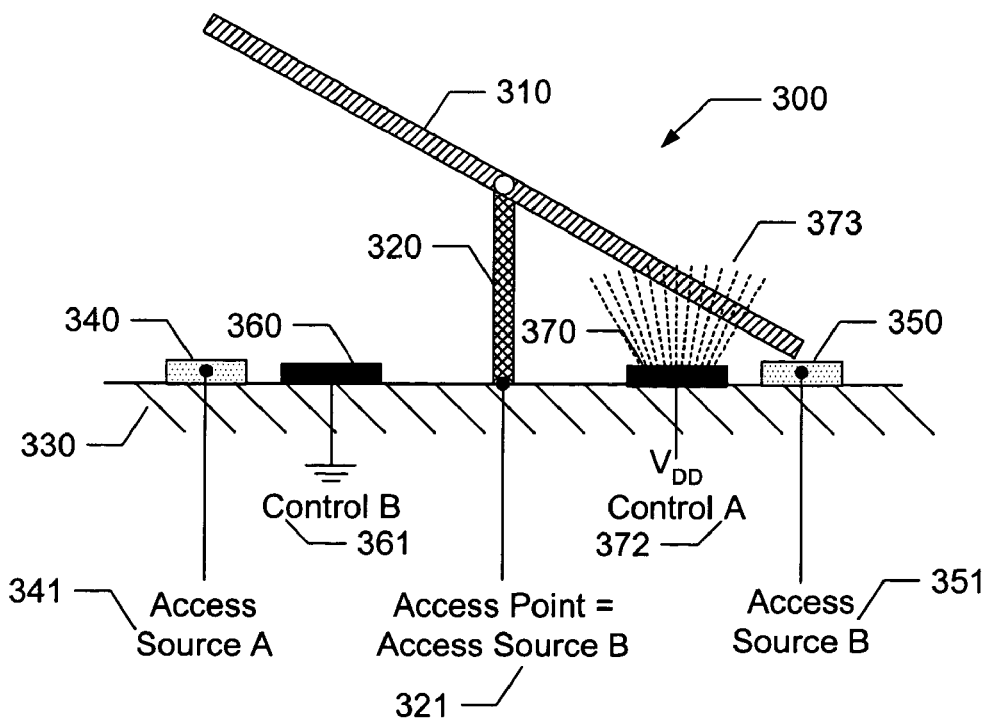
Figure 3C:
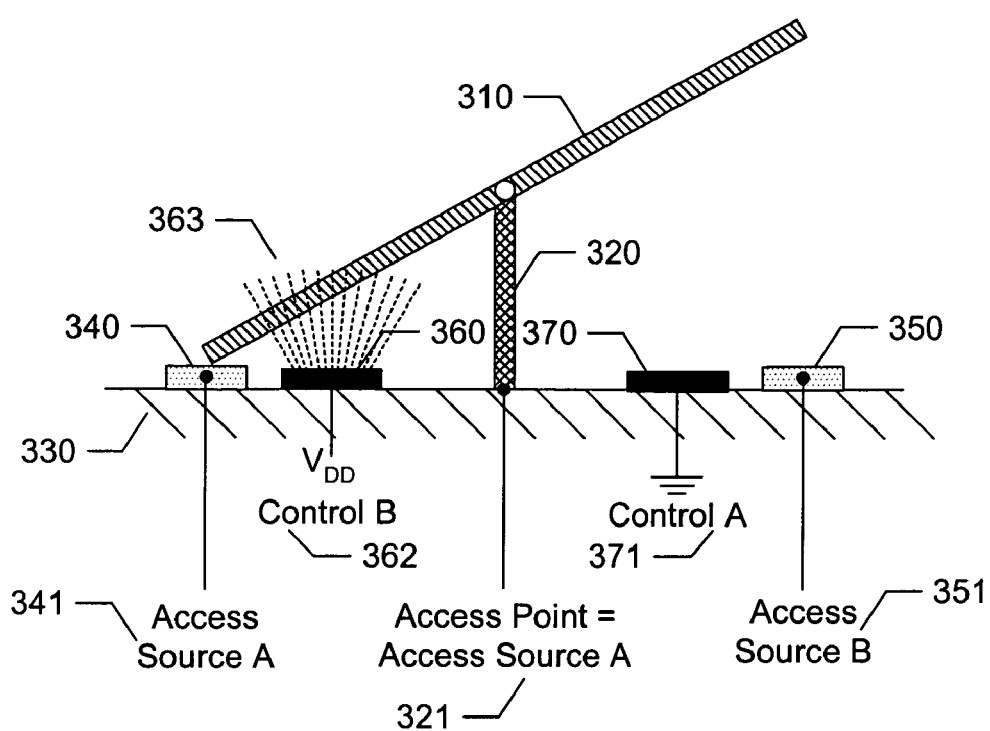

As illustrated in FIG. 3b, to select access source 351 for coupling to access point 322, a voltage 372 (e.g., a control signal) is applied to actuator 370. This generates an electrical field 373 depicted as dashed lines. This electric field causes cantilever 310 to deflect until cantilever 310 comes into contact with contact 350. An electrical connection is formed from contact 350 to conductive pivot 320. Thus, access point 321 is electrically coupled to access source 351. Similarly, as illustrated in FIG. 3c, a selection coupling access point 321 to access source 341 is effected by applying a voltage 362 to actuator 360.

Figure 4:
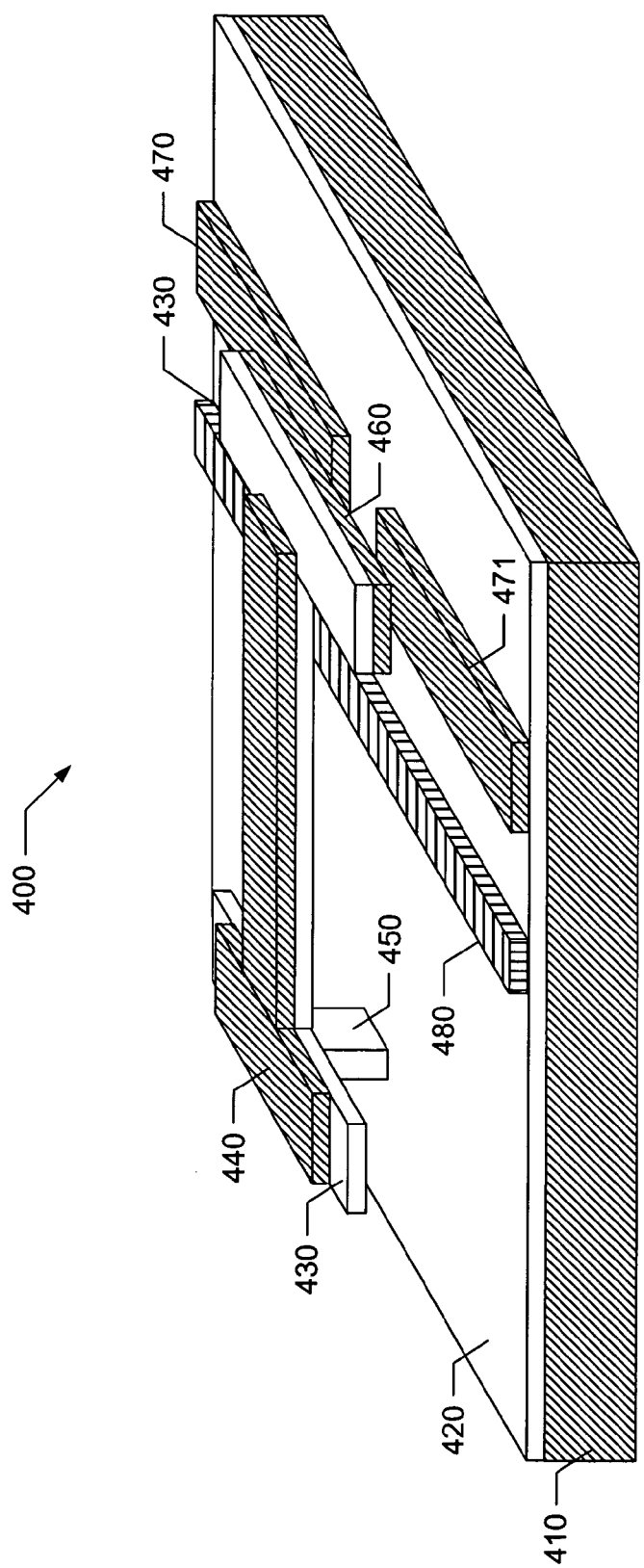
FIG. 4 illustrates another embodiment of a MEMs based electro-mechanical switch useful in relation to other embodiments of the present invention

FIG. 4 illustrates another example of a MEMs based electro-mechanical switch 400 useful in accordance with the present invention. Switch 400 includes a semiconductor substrate 410 with an insulating layer 420, such as silicon dioxide disposed thereon. A pivot 450, a bottom actuator 480, and a switch path 470, 471 are formed over insulating layer 420, and an insulating cantilever 430 and a top actuator 440 are supported by pivot 450. A metallic contact 460 is formed on the underside of cantilever 430. In operation, a voltage is applied between top actuator 440 and bottom actuator 480 causing cantilever 430 to deflect until metallic contact 430 contacts switch path 470, 471, thus completing a conductive path from segment 470 to segment 471. Based on the disclosure provided herein, one of ordinary skill in the art will appreciate that a variety of MEMs based electro-mechanical switches can be used in relation to the present invention.

Figure 5A:
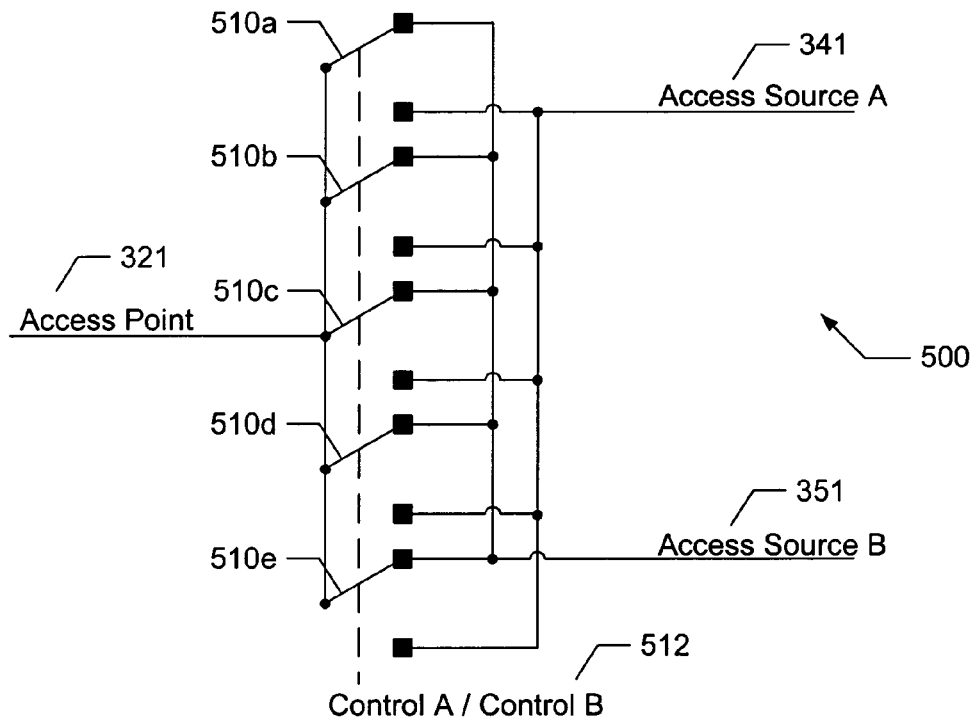
FIG. 5 illustrates various redundant switch configurations in accordance with some embodiments of the present invention.

FIG. 5 illustrates various redundant switch configurations in accordance with some embodiments of the present invention. Referring to FIG. 5a, a switch 500 couples one of access source 341 or access source 351 to access point 321. Switch 500 includes multiple switch paths 510 controlled by common control circuitry 512. In operation, when one of switch paths 510 is directed to switch from access source 341 to access source 351, or vice versa, all of switch paths 510 are switched. Thus, if one or more of switch paths 510 fail to switch, the selected coupling will still occur as others of switch paths 510 will complete the desired circuit. In some embodiments, switch 500 is designed such that a failing switch will return to an open position (e.g., neither access source 341 nor access source 351 being selected). Further, the devices can be designed such that completion of any of switch paths 510 is sufficient to provide the desired coupling.

In particular embodiments, a current detection, or other operation detection device as known to those of ordinary skill in the art can be implemented in relation to each of switch paths 510. Thus, when one of switch paths 510 fails to close, no current is detected, and a partial failure of the device can be communicated via communication element 220 to a central office. Thus, a subscriber accessing a network via access point 321 never sees the impending failure as at least one of switch paths 510 properly closes, but an entity maintaining the network can be alerted to the potential failure of the network, and make efforts to avoid the failure by, for example, replacing the micro electro-mechanical cross-connect or re-routing around the failing connection. Based on the disclosure provided herein, one of ordinary skill in the art will recognize that such switches can be combined in switch networks capable of coupling an access point to one of two, three, or more access sources.

Figure 5B:
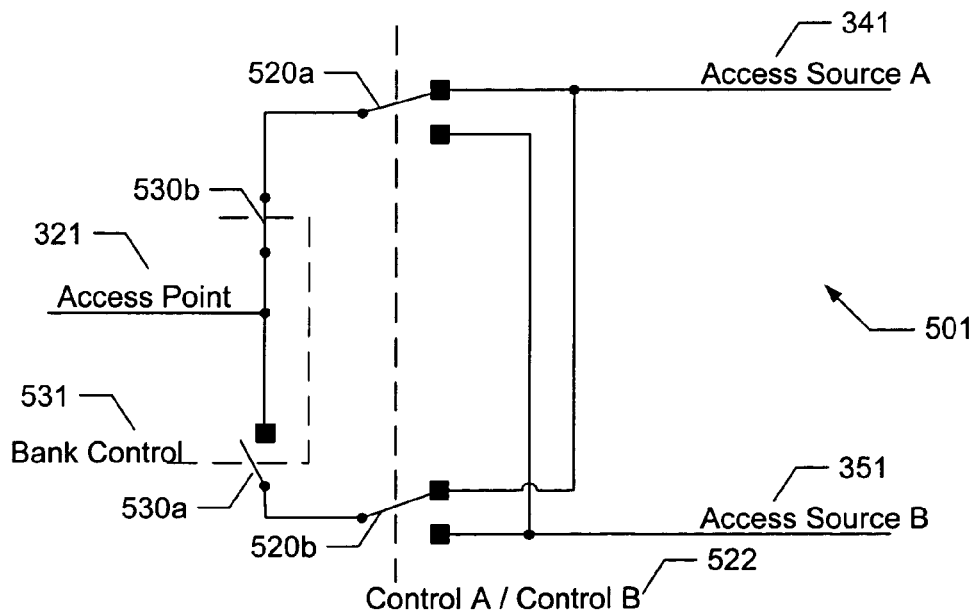

FIG. 5b depicts another exemplary redundant switch 501 in accordance with other embodiments of the present invention. Switch 501 couples one of access source 341 or access source 351 to access point 321. Switch 501 includes multiple switch paths 520 controlled by common control circuitry 522. In operation, one of switch paths 520 are selected via bank control 531 that controls bank switches 530. Thus, when bank switch 530a is closed, switch path 520b is the current carrying path. In contrast, when bank switch 530b is closed, switch path 520a is the current carrying path. Thus, if switch path 520a fails, bank control 531 can be changed, and a non-failing switch path 520b can be selected.

Figure 5C:
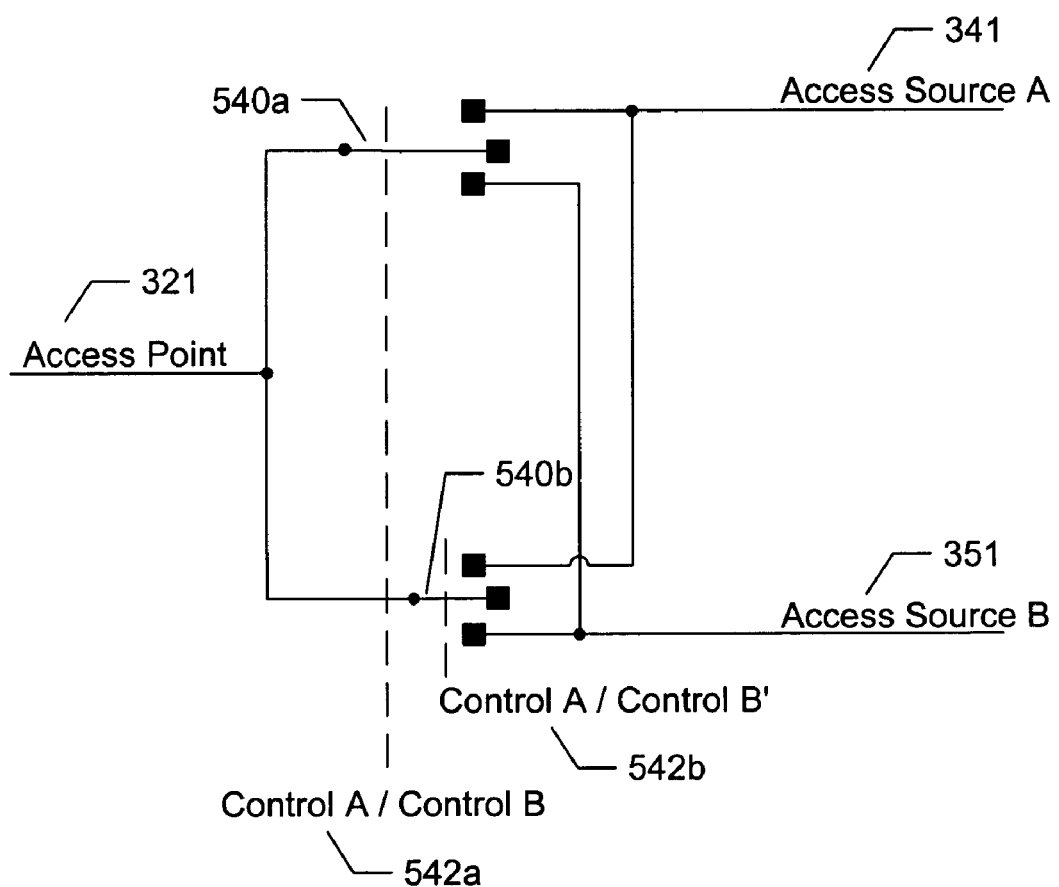

FIG. 5c illustrates yet another exemplary redundant switch 502 in accordance with other embodiments of the present invention. Switch 502 couples one of access source 341 or access source 351 to access point 321. Switch 502 includes multiple switch paths 540 controlled by common control circuitry 542. In operation, one or both of switch paths 540 are selected via common control circuitry 542 to direct access from access source 341 or to access source 351. Thus, if one or more of switch paths 540 fail, the other of switch paths 540 can be selected to complete the desired circuit. In some embodiments, switch 502 is designed such that a failing switch returns to an open position, or center position. Further, the devices can be designed such that completion of any of switch paths 540 is sufficient to provide the desired coupling.

Some embodiments of the invention further provide for switching between services and/or service ports using the aforementioned switching approach. Thus, a remote terminal or other telecommunications device can be implemented to include pooling resources. The network operator then utilizes the pool of resources on an as needed basis. This eliminates the need for multi-function cards that can only be used to perform one function at a time. Thus, for example, a combo card currently used can include both ADSL and POTS technology. Both functions are dedicated to a single access point. When the POTS service or the ADSL service is not being utilized, it cannot be utilized by another subscriber.

Further, if the subscriber associated with the access point decides to switch from ADSL to VDSL, a technician must be dispatched to switch the line card associated with the subscriber. This is costly. By pooling in accordance with the present invention, a remote terminal can include a variety of POTS, VDSL, ADSL, and other card types. These cards can be used by various subscribers on an as needed basis, thus reducing the cost of providing and maintaining a network. Alternatively, or in addition, the overall number of ports needed to service a particular number of subscribers is reduced.

Figure 6:
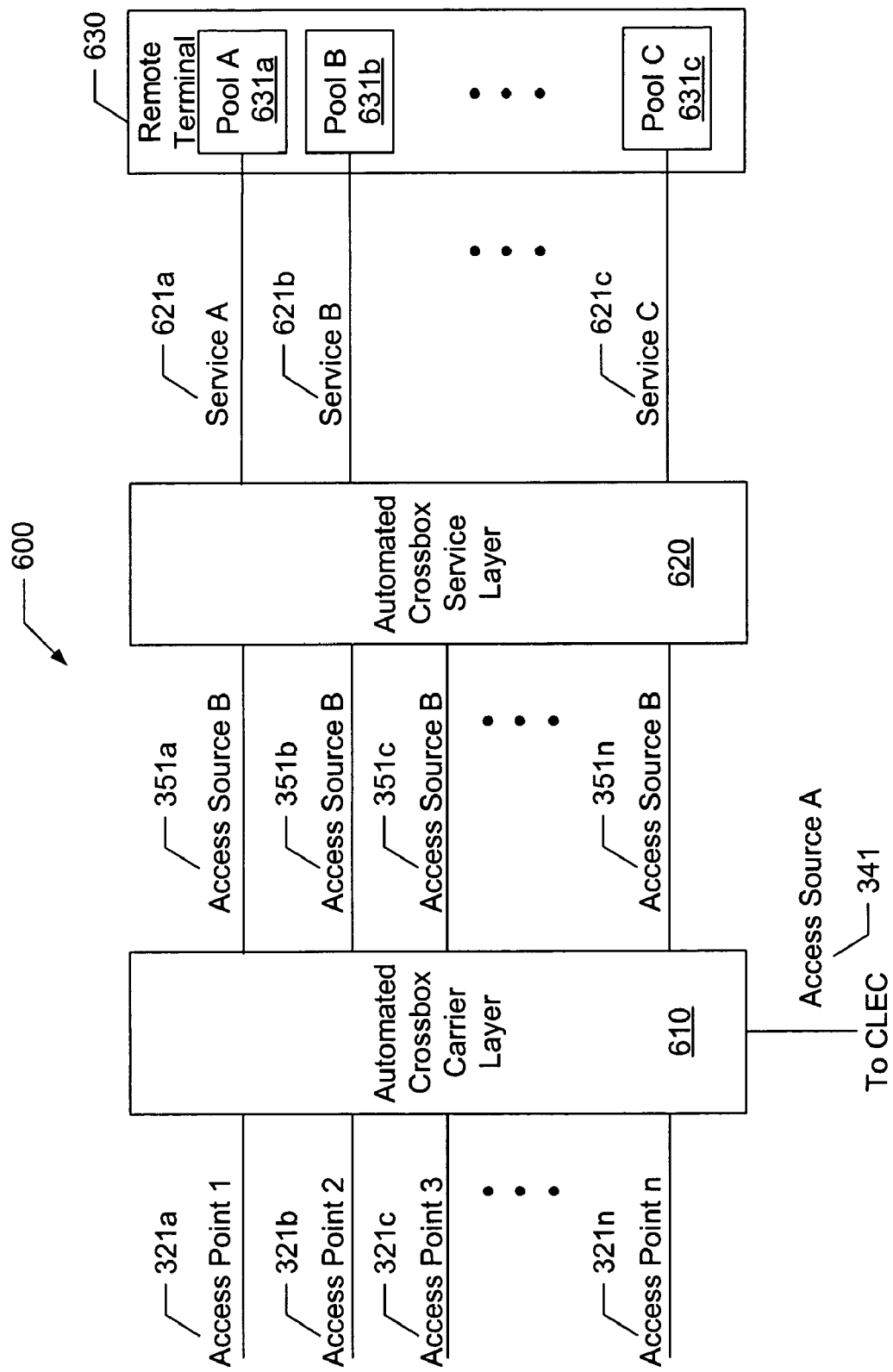
FIG. 6 illustrates a network resource pooling and/or cross-connect in accordance with some embodiments of the present invention.

FIG. 6 illustrates one such switching system 600 that is capable of switching between a variety of network services arranged in service pools 631, and provided in a remote terminal 630 (this could also be a central office where the subscribers are sufficiently close to the central office, thus obviating the need for a remote terminal). System 600 includes an automatic cross-box carrier layer 610 capable of selectively coupling access source A 341 or access source B 351 on an individual basis to a number of access points 321. Automated cross-box carrier layer 610 can be implemented as previously discussed.

Either or both of access source A 341 and access source B 351 can be coupled to an automated cross-box service layer 620. As depicted, access source B 351 is coupled to automated cross-box service layer 620 that is capable of selectively coupling one (or in some cases, multiple) of service types 631 to access source B 351, and ultimately to access point 321. Automated cross-box service layer 620 can comprise MEMs based switches as previously described. Such MEMs based switches can be switched upon commands generated remote from automated cross-box service layer 620. Further, such switches can support high frequency network signals without degrading the signals as would occur in transistor based switching.

Service pools 631 can include groups of devices that provide services that can be accessed by subscribers associated with access points 321. Such services can include always on xDSL services, on demand xDSL services, ISDN services, low rate modem services, caller identification services, video access services, cable modem services, and a variety of voice services. Such voice services are more fully described in U.S. Pat. No. 5,974,331. The entirety of the aforementioned patent is incorporated herein by reference for all purposes. The approaches for pooling and dynamically provisioning discussed in the aforementioned patent are applicable to the present invention that additionally provides devices, systems and methods that inventively make such approaches useful in relation to high speed network switching.

Thus, as just one example, pool A 631a can be provided to service POTS access, and thus may include a group of POTS cards. By pooling, a POTS card does not need to be dedicated to each access point 321 that includes a subscription to POTS services. Rather, because all access points 321 are not constantly accessing POTS services, POTS line cards can be dynamically provisioned to provide POTS services to a utilized access point 321, and when that access point 321 becomes inactive, the same POTS card can be dynamically provisioned to provide access services to another access point 321. Thus, the present invention provides a mechanism that can reduce the number of network devices that must be provided to support a given number of access points.

In addition, increased service levels can be supported. For example, pool A 631a can include xDSL line cards used to provide always on xDSL service, or some premium xDSL service. Pool B 631b can also include xDSL line cards used to provide a lower, a delayed on demand service level. Thus, the first service level may include a greater number of xDSL line cards for a given number of access points 321 than would be provided for the lower level of service. However, when line cards assigned to pool A 631a are not being utilized, they can be dynamically reassigned to pool B 631b, and thus temporarily increase the performance of the lower level service. The temporarily reassigned xDSL line card can then be assigned back to its original pool A 631a when it is needed to support the higher service level. Based upon the disclosure provided herein, one of ordinary skill in the art will appreciate a number of different services and/or service levels that can be supported using such a system. Further, one of ordinary skill in the art will understand that various pooling and/or access approaches can be applied in relation to the present invention. For example, an unutilized xDSL line card can be assigned to an unused group, and when additional resources are required, one of the xDSL line cards can be added on a round robin basis, thereby spreading the utilization somewhat evenly across the various line cards. Other more or less complicated approaches can be used for a variety of reasons.

Figure 7:
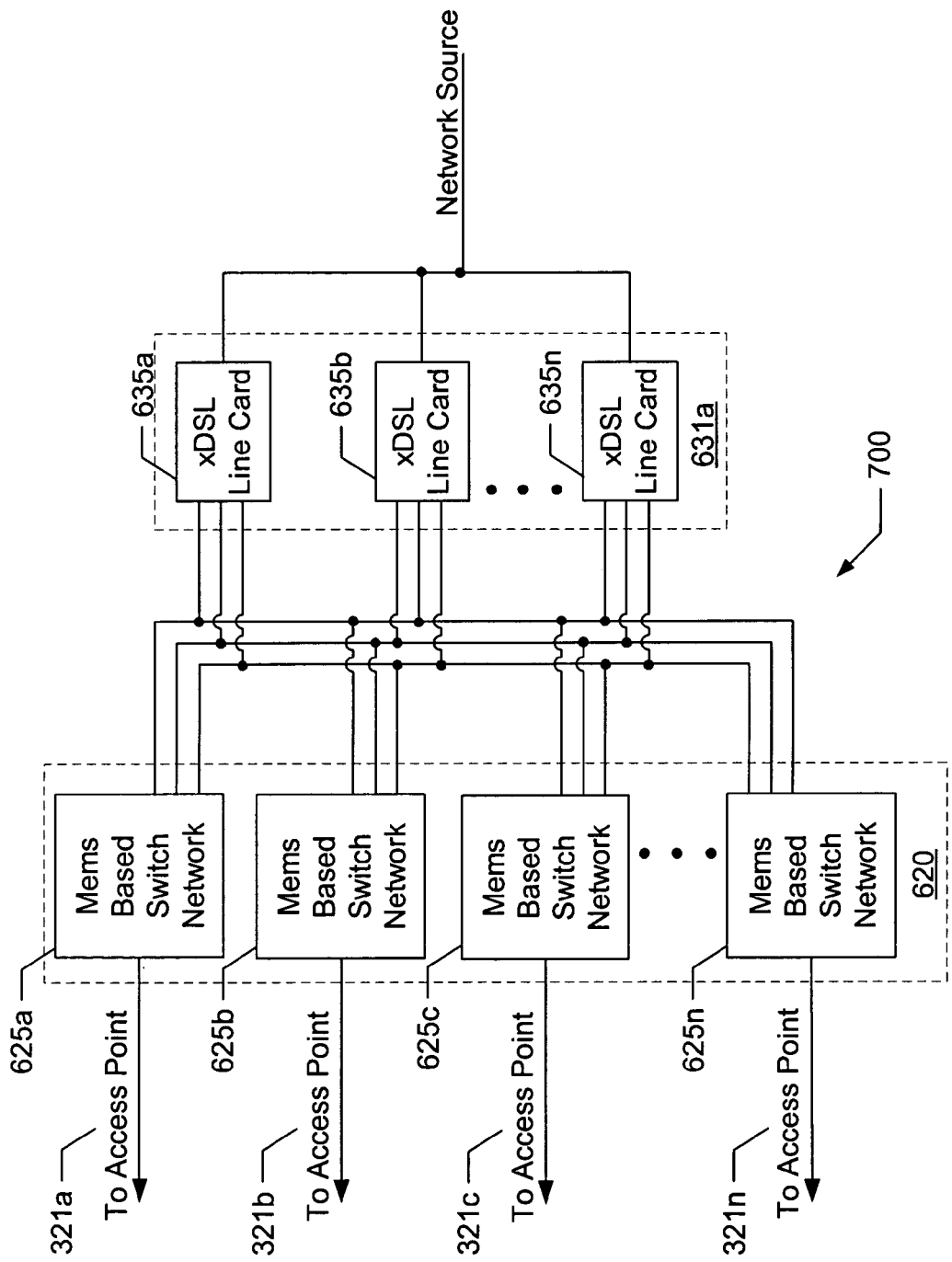
FIG. 7 illustrates a section of the system depicted in FIG. 6.

FIG. 7 illustrates one embodiment of a section 700 of system 600. Section 700 includes a number of MEMs based switch networks 625 that could be included as part of automated cross-box service layer 620. Each of switch networks 625 provides service selection for a particular access point 321. In addition, each of switch networks 625 are coupled to a number of service devices 635 (in this case xDSL line cards), that can be included within pool A 631*a* as previously described. In operation, when access point 321*a* is actively using the service associated with service devices 635, one of the various service devices is assigned to access point 321*a*. Once access point 321 becomes inactive, the previously assigned service device 635 is released to the pool of unused service devices 635, and can then be reassigned to the next used access point 321. In this way, a line card does not need to be dedicate to each access point 321, but rather can be dynamically assigned in a pooled approach allowing the number of line cards required to be reduced. This pooling process and located at a central network location, or at a remote location.

The invention has now been described in detail for purposes of clarity and understanding. However, it will be appreciated that certain changes and modifications may be practiced within the scope of the appended claims. For example, the automated cross-box functionality can be implemented as part of the remote terminal. Further, the automated cross-box functionality can be implemented either upstream, or downstream from network services (e.g., line cards) implemented in the remote terminal.

Accordingly, it should be recognized that many other systems, functions, methods, and combinations thereof are possible in accordance with the present invention. Thus, although the invention is described with reference to specific embodiments and figures thereof, the embodiments and figures are merely illustrative, and not limiting of the invention. Rather, the scope of the invention is to be determined solely by the appended claims.

What is claimed is:

1. An automated telecommunications switch system, the system comprising:
    a control device;
    a communication device, wherein the communication device is operable to receive a selection and to send the selection to the control device; and
    a micro electro-mechanical cross-connect, wherein the micro electro-mechanical cross-connect is operable to route a source to an output based at least in part on the selection, and
    wherein the control device is operable to receive the selection from the communication device and to provide a selector to the micro electro-mechanical cross-connect, and wherein the selector is a derivative of the selection.

2. The system of claim 1, wherein the communication device and the control device are implemented on a semiconductor device.

3. The system of claim 2, wherein the semiconductor device is a CMOS device.

4. The system of claim 2, wherein the selector is a CMOS level output.

5. The system of claim 1, the system further comprising a microprocessor.

6. The system of claim 5, wherein the microprocessor is integrated with the communication device.

7. The system of claim 1, wherein the control device is integrated in a common package with the micro electro-mechanical cross-connect.

8. The system of claim 1, wherein the micro electro-mechanical cross-connect is a silicon based MEMS device.

9. The system of claim 8, wherein the micro electro-mechanical cross-connect is implemented with at least a first contact and a second contact coupling the source to the output.

10. The system of claim 9, wherein the first contact is controlled apart from the second contact.

11. A telecommunications system, the telecommunications system comprising:
    a first source access;
    a second source access;
    a control input;
    a control device;
    a communication device, wherein the communication device is operable to receive the control input and to send the control input to the control device; and
    a micro electro-mechanical cross-connect, wherein the micro electro-mechanical cross-connect is operable to route one of the first source access and the second source access to an output based at least in part on the control input, and
    wherein the control device is operable to receive the control input from the communication device and to provide a selector to the micro electro-mechanical cross-connect, and wherein the selector is a derivative of the control input.

12. The system of claim 11, the system further comprising a microprocessor integrated with the communication device and the control device.

13. The system of claim 12, wherein the microprocessor, communication device, and control device are implemented in the same semiconductor package.

14. The system of claim 12, wherein the microprocessor, communication device, and control device are implemented in the same semiconductor die.

15. The system of claim 11, wherein the control device is integrated in a common package with the micro electro-mechanical cross-connect.

16. The system of claim 11, wherein the micro electro-mechanical cross-connect is a silicon based MEMS device.

17. The system of claim 11, wherein the first source access is a high frequency source access.

18. The system of claim 11, wherein the first source input is a xDSL access.

19. The system of claim 11, wherein the control input is provided by a central office in communication with the communication device.

20. The system of claim 19, wherein the first source access is provided by the central office.

21. A method for provisioning a telecommunications network, the method comprising:
    receiving a configuration request in relation to the telecommunications network;
    formatting the configuration request as a selector;

communicating the selector to a network device coupled to the telecommunications network, wherein the network device includes:

a communication element, wherein the communication element is operable to receive the selector;

a micro electro-mechanical cross-connect, wherein the micro electro-mechanical cross-connect is operable to route an access source to an access point; and a control device, wherein the control device is operable to receive the selector from the communication device, and to provide a control signal to the micro electro-mechanical cross-connect, and wherein the control signal is a derivative of the selector.

* * * * *